March 4, 1941.  E. S. TAYLOR  2,233,498
RESILIENT TORQUE METER
Filed Jan. 12, 1939
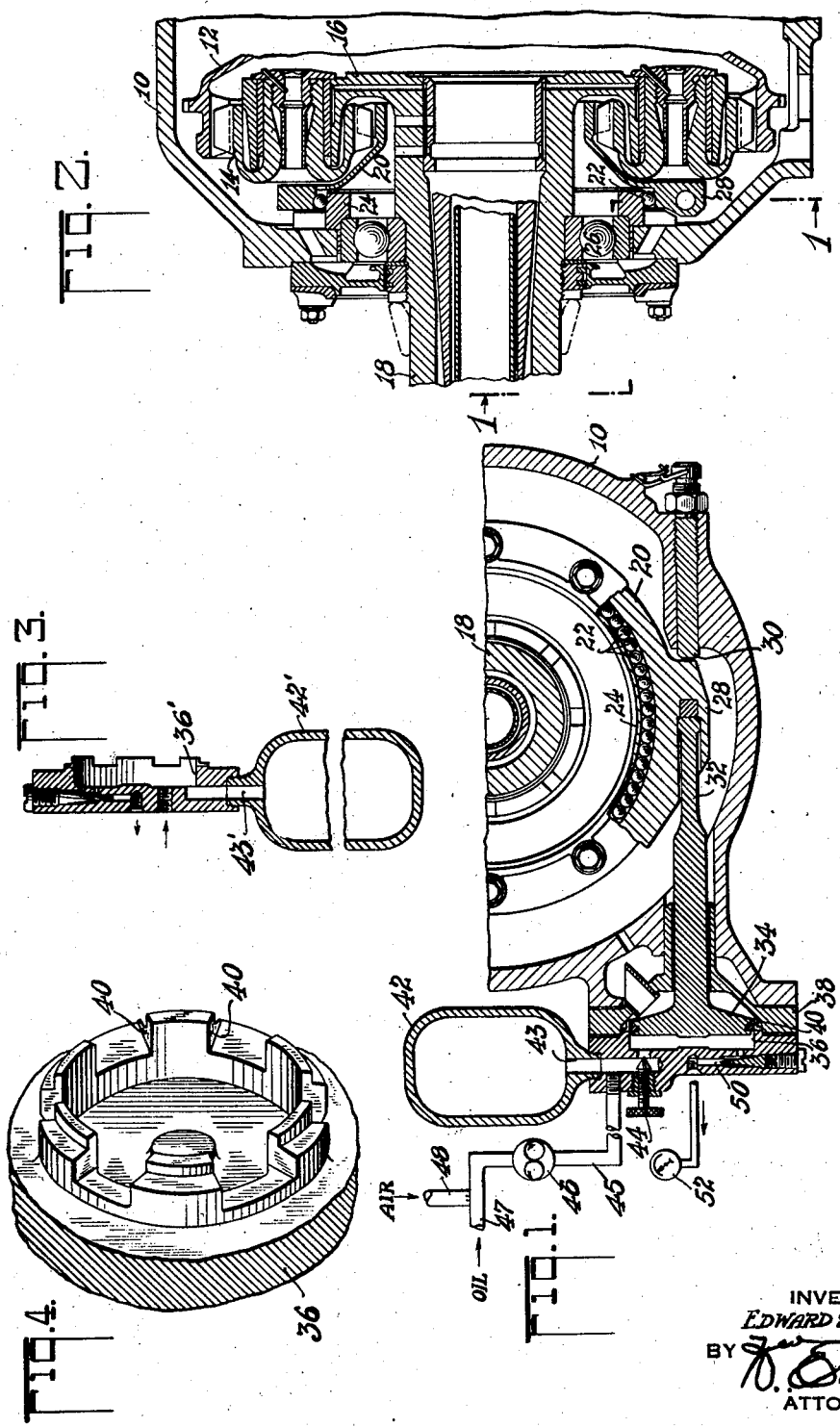
INVENTOR
EDWARD S. TAYLOR
BY
ATTORNEY Patented Mar. 4, 1941

2,233,498

UNITED STATES PATENT OFFICE 2,233,498

RESILIENT TORQUE METER

Edward S. Taylor, Cambridge, Mass., assignor to Wright Aeronautical Corporation, a corporation of New York Application January 12, 1939, Serial No. 250,479

8 Claims. (Cl. 74—305)

This invention relates to means for preventing resonant vibration and particularly, provides a compact apparatus (which may be coordinated with a torsional measuring means), by which the resonant torsional vibrations in a shaft system may be avoided in operating speed ranges of the system.

In shaft systems subject to exciting impulses of various orders, it is known that resonance of the natural vibration frequencies of the shaft system with the impulses is objectionable and destructive, and the desideratum is to so construct the shaft system that its natural frequencies are outside the frequency range of the impulses. This may be done either by increasing the stiffness or by increasing the flexibility of the system. In the latter type of solution for the problem, spring drives of various forms have been used, the flexibility of the springs being a determining factor in evaluating the natural frequency of the shaft system. However, where the speed and torque range in the system is great, a metallic spring system becomes excessively bulky and heavy, unless the system permits of the use of long flexible drive shafts. If spring couplings or the like be used, the springs necessary to give proper flexibility along with adequate deflection and spring load to assume the driven load may become larger and heavier than any integral part of the shaft system itself.

This invention sets out to teach the use of fluids as a spring medium to afford added flexibility in shaft systems, particularly those wherein weight and bulk is at a premium. In the fluid spring, fluid may be added or removed to adjust pressure therein, with changes in driving load so that little or no allowance need be made for load deflection. In effect, the stress or more properly, pressure in the fluid spring is changed with load while maintaining the deflection constant, as distinguished from a metallic spring wherein the stress therein can only increase with increases in deflection. Thus, the fluid spring is of nearly constant size regardless of load, vibratory excursions therein being of small order. In a metal spring, the vibratory excursions are likewise small, but deflections due to load are extremely large.

An object of the invention is to provide a compact form of vibration damper utilizing the resilient compressive characteristics of fluids or gases under high pressure for introducing into a power shaft system a degree of flexibility sufficient to greatly lower the natural frequencies of the system.

Another object of the invention is to provide a relatively constant volume fluid spring, an associated object being to so coordinate the fluid spring arrangement that it may be used as a torque meter in the transmission system. A further object, of more specific character, is to coordinate, with a torque measuring apparatus in a geared aircraft engine, a fluid spring arrangement by which natural frequencies of the shaft system in the engine may be reduced.

Further objects are to provide alternate means by which either liquid or gaseous springs may be utilized, along with fluid supply means by which the apparatus is maintained in an operative condition during engine operation.

Further objects will become apparent in reading the annexed detailed description in connection with the drawing, in which Fig. 1 is a fragmentary cross-section through the forward part of an aircraft engine, comprising a section on the line I—I of Fig. 2;

Fig. 2 is an axial fragmentary section through the forward part of an engine reduction gear;

Fig. 3 is a section through an alternative arrangement of fluid spring mechanism, and Fig. 4 is a fragmentary perspective view of part of the fluid spring mechanism.

A large part of the structure of the present invention is similar to that shown in the co-pending application of Roland Chilton, Serial No. 248,052, filed December 28, 1938. I show an engine nose housing 10 secured, as in conventional aircraft engine practice, to a crankcase, not shown. A bell gear 12 secured to the engine crankshaft, not shown, forms a driving member which engages a plurality of planet pinions 14 journalled on a back plate 16 integral with a propeller shaft 18, the pinions 14 meshing with a sun gear 20 journalled through balls 22 on a race 24 secured to the housing 10. The propeller shaft 18 is journalled in the housing by the usual bearing 26.

As may be seen in Fig. 1, the sun gear 20 includes a projecting torque arm 28 engageable at one end with a tangentially disposed adjustable stop 30, while a strut 32 is engaged in a counterbore in the arm 28, the strut carrying, at its other end, a piston 34 slidable in a cylinder 36 secured, through an adapter 38, to the engine nose 10. The elements 12, 14, 16 and 20 comprise a conventional form of reduction gear in which the sun gear 20 is substantially fixed and is subject to reaction forces from the driving effort in proportion to the torque transmitted. Accordingly, the compressive load on the strut 32, during operation, is proportional to engine torque. The stop 30 is adjusted for clearance so that the sun gear 20 with its projection 28 has slight circumferential freedom by which the piston 34 may move with respect to the cylinder 36. The latter is provided with relief slots 40, as clearly shown in Fig. 4, and the piston 34 is so adjusted as to open or close these slots. The cover of the cylinder 36 carries a flask 42 communicating through a passage 43 with the cylinder interior, a valve 44 being provided in the passage 43 for adjustment of the rate of fluid flow between the flask and cylinder. Also, into the cylinder fluid is fed from a line 45 leading from a pump 46, the intake side of latter being fed from an oil supply line 47 having an air bleed 48 therein. The cylinder 36 communicates, through an adthe sun gear 20 is reached and the gauge 52 accordingly will register a reading proportional to justable orifice 50, with a pressure gauge 52 which may be calibrated to indicate torque. As a torque meter, the apparatus described functions as follows: A relatively uniform volume of oil and air is fed by the pump 46 to the cylinder 36, and this fluid builds up in pressure to the extent necessary to move the piston 34 against engine torque until the relief slots 40 uncover. When the slots open, the pressure in the cylinder 36 will be relieved until a balance with torque reaction on torque.

Now, the flask 42 will gradually fill with air, the air entering with the oil gravitationally separating from the latter, excess air and oil being discharged through the slots 40 in the cylinder 36. The air in the flask will be maintained at a pressure proportional to torque transmitted and will act as a spring of certain flexibility which flexibility will add to that of the original shaft system to endow the new system with a greatly augmented flexibility.

Fig. 3 shows a modification in which the cylinder, designated as 36', carries a flask 42' therebelow, the passage 43' between the cylinder and flask entering the top of the latter. When using this device, the air bleed shown in Fig. 1 need not be used, since the flask 42' will fill up with oil and the liquid oil will act as the spring in place of the air in the flask 42. Since the volumetric modulus of elasticity of liquid oil is many times higher than that of air, the volumetric capacity of the oil flask 42' must necessarily be much greater than that of the air flask 42 to obtain analogous spring action.

Primary calculations as to the pressure in and size of flasks necessary for oil and air respectively, have been made for a typical geared aircraft engine of around 1,000 H. P. When using oil, a flask volume of 360 cu. in. under 4,000 lbs./sq. in. pressure would serve to have the desired effect in altering the natural frequency of the shaft system to such an extent as to avoid any possibility of resonance in the system at operating speeds.

Using air in the flasks, a flask volume of 140 cu. in. at 200 lbs./sq. in. pressure, would serve the same purpose. Variations in the capacity of the flasks with inverse variations of the pressures necessary are readily calculable to provide operative vibration dampers. A fluid spring of the character herein taught is enormously lighter and more compact than metallic springs of equivalent capacity and flexibility, and is not subject to fatigue failure. Also, the pressure produced in the fluid spring, as indicated, is useful in measuring torque transmitted.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a power plant crankshaft-propeller system, a reduction gear between the shaft and propeller including a reaction gear, and means for reducing the natural torsional period of the shaft system comprising a reservoir for elastic fluid, a cylinder communicating therewith, a piston engaged by the reaction gear and urged thereby into said cylinder to compress the fluid in said reservoir, and means to add or remove fluid to or from the reservoir to maintain same at constant volume regardless of changes in the pressure imposed thereon.

2. In a power plant crankshaft-propeller system, a reduction gear between the shaft and propeller including a reaction gear, and means for reducing the natural torsional period of the shaft system comprising a reservoir for elastic fluid, a cylinder communicating therewith, a piston engaged by the reaction gear and urged thereby into said cylinder to compress the fluid in said reservoir, and means for maintaining the reservoir-cylinder system at constant volume under the various pressures imposed on the fluid therein by various force reactions on said reaction gear.

3. In a transmission system including a housing, a drive shaft and a concentric driven shaft having a reduction gear therebetween, said reduction gear including an oscillatable but nonrotative reaction member held by said housing, means for reducing the natural vibration frequency of said shaft system comprising a substantially constant volume of elastic fluid confined in said housing and compressed by said reaction member, and means to maintain the fluid at constant volume under all operating conditions.

4. In a transmission system including a housing, a drive shaft and a concentric driven shaft having a reduction gear therebetween, said reduction gear including an oscillatable but nonrotative reaction member held by said housing, means for reducing the natural vibration frequency of said shaft system comprising a housing carried constant volume container having elastic fluid therein, mechanism actuated by said reaction member for imposing pressure on said fluid proportional to the force reaction of said member, and means for adding or removing fluid to or from the container to maintain the container full of the elastic fluid at all times.

5. In a transmission system including a housing, a drive shaft and a concentric driven shaft having a reduction gear therebetween, said reduction gear including an oscillatable but nonrotative reaction member held by said housing, and means for reducing the natural vibration frequency of said shaft system comprising a housing carried constant volume container having elastic fluid therein, mechanism actuated by said reaction member for imposing pressure on said fluid proportional to the force reaction of said member, means for measuring the fluid pressure and means for adding or removing fluid to or from the container to maintain the container full of the elastic fluid at all times.

6. In a power plant comprising a drive shaft and a driven shaft connected by a reduction gear thereto, the reduction gear including a reaction element, a piston connected to said element, a cylinder within which said piston engages and having relief ports uncoverable by said piston, said cylinder comprising a chamber of considerable volumetric capacity, and means for feeding elastic fluid under pressure to said cylinder to maintain a constant volume thereof in the cylinder under all operating conditions.

7. In a power plant transmission including a reduction gear having an oscillatable reaction element, means for holding said element against the torque reaction comprising a piston member engaging a cylinder member and containing elastic fluid, one said member being fixed and the other being oscillatable with said reaction element, said members comprising a chamber of a volumetric fluid capacity of such order that the contained fluid acts as spring to reduce the natural frequency of the transmission system, and means to add or remove elastic fluid to or from said chamber in accordance with torque variations to maintain said chamber at substantially constant effective volume under all load conditions.

8. In a power plant transmission including a reduction gear having an oscillatable reaction element, means for holding said element against the torque reaction comprising a piston member engaging a cylinder member and containing elastic fluid, one said member being fixed and the other being oscillatable with said reaction element, said members comprising a chamber of a volumetric fluid capacity of such order that the contained fluid acts as spring to reduce the natural vibration frequency of the transmission system, and means to maintain said fluid at a pressure substantially proportional to the torque transmitted, and to add or remove fluid to or from said chamber in accordance with torque variations to maintain said chamber at substantially constant effective volume under all load conditions.

EDWARD S. TAYLOR.